(12) United States Patent
Alex et al.

(10) Patent No.: US 8,716,366 B2
(45) Date of Patent: May 6, 2014

(54) PROCESS FOR THE PREPARATION OF CARBON BLACK/SILICA/NANOCLAY MASTER BATCH FROM FRESH NATURAL RUBBER LATEX

(76) Inventors: Rosamma Alex, Kottayam (IN); Kavumnadayil Krishnan Sasidharan, Kottayam (IN); James Jacob, Kottayam (IN)

(*) Notice: Subject to any disclaimer, the term of this patent is extended or adjusted under 35 U.S.C. 154(b) by 52 days.

(21) Appl. No.: 13/557,258

(22) Filed: Jul. 25, 2012

(65) Prior Publication Data
US 2013/0079444 A1 Mar. 28, 2013

(30) Foreign Application Priority Data
Jul. 26, 2011 (IN) .............................. 2564/CHE/2011

(51) Int. Cl.
*C08J 3/215* (2006.01)

(52) U.S. Cl.
USPC ............................ 523/334; 523/333; 523/351

(58) Field of Classification Search
USPC .......................................... 523/333, 334, 351
See application file for complete search history.

(56) References Cited

U.S. PATENT DOCUMENTS

2010/0022684 A1* 1/2010 Wallen et al. .................. 523/334

* cited by examiner

*Primary Examiner* — Edward Cain
(74) *Attorney, Agent, or Firm* — Nigamnarayan Acharya; Seyfarth Shaw LLP

(57) ABSTRACT

The present invention relates to a process for preparing tri-filler incorporated natural rubber master batch. The fillers used in the present invention are carbon black, silica and nano-clay (modified montmorillonite clay, Cloisite 93 A). The process of preparing fillers incorporated master batch involves preparation of the individual filler dispersions by mixing each filler with surfactants. Further fresh rubber latex is soap sensitized by mixing it with surfactant. The filler dispersions are added to the soap sensitized rubber latex slowly under stirring to form the master mix. Then the master mix is coagulated by the addition of acid to form coagulum. The coagulum is dewatered and dried to obtain filler incorporated natural rubber master batch.

2 Claims, No Drawings

PROCESS FOR THE PREPARATION OF CARBON BLACK/SILICA/NANOCLAY MASTER BATCH FROM FRESH NATURAL RUBBER LATEX

PRIORITY CLAIM

This patent application claims priority to Indian Patent Application No. 2564/CHE/2011, filed Jul. 26, 2011, the disclosure of which is incorporated herein by reference in its entirety.

The following specification describes and ascertains the nature of this invention and the manner in which it is to be performed:

FIELD OF INVENTION

The present invention relates to a process of preparing a natural rubber master batch. More particularly the present invention relates to a process of preparing carbon black, silica and nanoclay tri-filler master batch from Fresh Natural Rubber Latex.

PRIOR ART

Fillers when added to polymer systems are known to cause a considerable change in dynamic properties. One of the consequences of incorporation of filler into a polymer is a considerable change in dynamic properties of the rubber, both modulus and hysteresis. This phenomenon has been investigated in depth especially in relation to rubber products.

The level of dispersion of fillers like carbon black, silica and nanoclay in a rubber matrix is an important issue in a large variety of rubber products. Though carbon black could be easily dispersed in natural rubber by conventional mill mixing, there are issues such as air pollution and higher energy consumption. In the case of silica and nanoclay, it is extremely difficult to disperse these highly aggregate fillers in NR using a mixing mill.

In the case of carbon black, preparation of latex-carbon black master batch by the addition of carbon black as a slurry has been suggested as one of the methods to avoid some of these problems. To be economically viable, fresh NR latex obtained from the field has to be mixed with carbon black slurry and it is essential to ensure that both latex and the carbon black slurry coagulate simultaneously to avoid loss of filler during coagulation. One of the approaches for production of carbon black master batch was by mixing NR latex with carbon black slurry and then coagulating the mixture chemically. However, the mismatch in rate of coagulation of fresh field latex and the carbon black slurry led to the poor dispersion of carbon black in rubber as well as there was significant loss of filler during the coagulation, making the process economically unviable.

US patent application 2009003659 discloses a method for producing a rubber-filler composite, comprising a dispersion step of irradiating filler slurry containing filler with high amplitude ultrasonic waves having amplitude of 80 μm or more to finely disperse the filler in the slurry, and a mixing step of mixing the dispersion-treated filler slurry with concentrated natural rubber latex. The dispersion-treated filler slurry and the concentrated natural rubber latex are mixed in the mixing step while conducting irradiation with high amplitude ultrasonic waves having amplitude of 80 μm or more. The filler used is carbon black.

US Patent Application 20080262123 discloses a method for the production Carbon Black Masterbatches. Prevulcanized latex is firstly diluted to dry rubber content (DRC) of 10 to 15%. The prevulcanized latex can be either natural latex or synthetic latex. Carbon black is then added to the diluted prevulcanized latex with vigorous stirring. The final product mix is treated with a small quantity of formic acid to ensure total coagulation and rubber coating of the carbon black powder.

US2009/0088496A1 patent discloses a process for the preparation of master batch wherein a rubber-filler composite is disclosed. The rubber-filler composite is obtained by jetting a field latex of a natural rubber in a form of a high-speed flow having a flow rate of 500 m/sec or more into a mixing chamber while supplying a filler slurry containing a filler to the mixing chamber, thereby separating and removing protein in the field latex from a rubber component and at the same time, mixing the field latex and the filler slurry.

U.S. Pat. No. 6,841,606 patent discloses a process wherein natural rubber master batch is prepared by mixing natural rubber latex having its amide linkages cleaved and an aqueous slurry having a filler dispersed in water. The process includes Step 1 of cleaving amide linkages in a natural rubber latex; and Step 2 for mixing the latex having its amide linkages cleaved with an aqueous slurry having been dispersed with at least one filler selected from the group consisting of carbon black, silica and an inorganic filler.

U.S. Pat. No. 7,786,208 patent discloses a method for producing a modified natural rubber master batch, which comprises the step of mixing a modified natural rubber latex with fillers. The rubber latex is modified by the addition of a polar group-containing monomer. Further the modified rubber latex is mixed with a slurry solution formed by previously dispersing at least one filler selected from the group consisting of carbon black, silica and an inorganic compound.

U.S. Pat. No. 7,960,466 patent discloses a process of mixing a natural rubber latex with a slurry containing water and a carbon black dispersed therein. The natural rubber latex used preferably has been treated in a cleavage step of cleaving amide bonds in the natural rubber latex. A surfactant is preferably used to enhance the stability of the latex. The master batch may further contain various additives such as filler including silica or an inorganic filler, a surfactant, a vulcanizing agent, an anti-aging agent, a colorant, and a dispersant as required in addition to the carbon black.

The prior arts disclose various preparation processes of different types of master batches from synthetic and natural rubber latex. As compared with a wet master batch made of synthetic rubbers, the natural rubber latex shows improving effect on the processability.

Even if the prior arts are making use of natural rubber latex, these natural rubber latex are pretreated or various modifications are performed like cleavage of amide linkages, hydrolysis of proteins by enzymes, addition of monomer units etc., to prepare the master batch. Further other earlier processes make use of different types of processing oils, and techniques like Ultrasonication for mixing the latex and slurry which makes the preparation of master batches tedious and cumbersome.

So there exists a need for a more simplified and economic process for the synthesis of master batches which is devoid of pretreatment of natural rubber latex, and also eliminate the processing aids in the method of preparation of master batch.

OBJECT OF THE INVENTION

The object of the present invention is to develop a process for the preparation of filler incorporated natural rubber latex master batch by utilizing soap sensitized fresh natural rubber latex.

Another object of the present invention is to utilize combination of carbon black, silica and nano clay as fillers for the preparation of master batch but to prepare the individual filler slurry solutions by mixing each filler with a suitable surfactant.

Yet another object of the present invention is to add the prepared filler slurries into the soap sensitized latex under stirring to form a master mixture followed by coagulation by the addition of acid to form the master batch.

Yet another object of the present invention is to develop a process of preparing mixed tri-filler master batch with negligible or no loss of filler during coagulation.

Yet another object of the present invention is to develop a process for preparing master batch without the aid of mixing agents other than surfactants for dispersion of fillers into the natural rubber latex.

Yet another object of the invention is to prepare a master batch having superior cure characteristics, vulcanisate properties and mechanical properties compared to the master batches prepared by conventional batches.

Further object of the present invention is to utilize the prepared master batch for the manufacture of tyres as well as demanding non-tyre products such as conveyer belts, engine mountings and bridge bearings.

SUMMARY

The present invention relates to a process for preparing tri-filler incorporated natural rubber master batch. The fillers used in the present invention are carbon black, silica and nano-clay (modified montmorillonite clay, Cloisite 93 A). The individual filler dispersions are prepared by mixing each filler with suitable surfactants. Further fresh rubber latex is soap sensitized by mixing it with suitable surfactant. The filler dispersions are added to the soap sensitized rubber latex slowly under stirring to form the master mix. Then the master mix is coagulated by the addition of acid to form coagulum. The coagulum is dewatered and dried to obtain filler incorporated natural rubber master batch.

DESCRIPTION OF THE INVENTION

The present invention relates to a process of preparing carbon black, silica and nanoclay master batch with enhanced mechanical properties from fresh natural rubber latex. The unit operations in the process are the preparation of filler dispersion, in presence of suitable surfactant, addition of the dispersion to the soap sensitized fresh natural rubber latex under stirring, coagulation of the mixture by the addition of acid, dewatering of the coagulum, and drying to obtain filler incorporated NR.

Lauric acid, Di ethylene glycol, ammonium hydroxide, Dispersol F (sodium salt of sulphonic acid:sodium naphthalene formaldehyde sulphonate) and sulphuric acid used were rubber grade chemicals. The surfactant used was based on alkali salt of fatty acids and is selected from the group consisting of laurate (commercial grade). Dispersions of carbon black and silica were prepared separately by the conventional ball milling process in presence of a suitable surfactant such as Dispersol F and ammonium laurate. For the preparation of silica dispersion a small quantity of diethylene glycol was also added. Nanoclay dispersion was prepared using a mechanical stirrer in presence of a surfactant, ammonium laurate. The dispersion was added slowly in to fresh natural rubber latex sensitized with suitable surfactant consisting of ammonium laurate, under stirring and coagulated by the addition of sulphuric acids of concentration 0.8% (w/w/) to produce the mixed filler master batch. In this—method the filler-latex mixture is co-coagulated by addition of acid. Since the soap sensitization of fresh latex ensured the simultaneous coagulation of latex and filler slurry, there was practically negligible or no loss of filler during coagulation. The coagulum is then processed into thin sheets by passing through smooth rollers, washed to remove acid and then dried at 70° C.

The mixed filler master batch is converted to a rubber compound by mixing with curatives in a two-roll mill. The cure time is determined using an MDR and test samples were cured in a hydraulic press at 150° C. A conventional mill mixed compound was also prepared for comparison.

EXAMPLES

The present invention is described in more detail by reference to the following Examples, but the invention is not construed as being limited thereto.

Example 1

Preparation of Rubber Master Batch

The preparation of master batch comprises of the following steps:
(a) Preparation of Carbon Black Dispersion:
Dispersions of carbon black can be prepared by the conventional ball milling process in the presence of a suitable surfactant such as Dispersol F, ammonium laurate or combination thereof.
(b) Preparation of Silica Dispersion:
Dispersions of silica can be prepared by the conventional ball milling process in the presence of a diethylene glycol and suitable surfactant such as Dispersol F, ammonium laurate or combination thereof
(c) Preparation of Nanoclay Dispersion:
Dispersion of nanoclay can be using a mechanical stirrer in presence of a surfactant, ammonium laurate.
(d) Preparation of Soap Sensitized Rubber Latex
The fresh natural rubber latex was sensitized by mixing it with surfactant ammonium laurate.
(e) Preparation of Master Batch
The three different dispersions comprising of carbon black dispersion, silica dispersion and nanoclay dispersion were added to the soap sensitized natural rubber latex under constant stirring to form a master mixture. The master mixture was coagulated by adding dilute sulphuric acid and the coagulum was dewaterd and dried to obtain the master batch

Example 2

A masterbatch (M1) was prepared in the same manner as in Example 1, in which the amount of Carbon black, silica and nanoclay are 25 phr, 25 phr and 3 phr respectively.

Example 3

A masterbatch (M2) was prepared in the same manner as in Example 1, in which the amount of Carbon black, silica and nanoclay are 25 phr, 25 phr and 5 phr respectively.

Example 4

A masterbatch (M3) was prepared in the same manner as in Example 1, in which the amount of Carbon black, silica and nanoclay are 25 phr, 25 phr and 10 phr respectively.

Example 5

A masterbatch (M4) was prepared in the same manner as in Example 1, in which the amount of Carbon black, silica and nanoclay are 30 phr, 30 phr and 0 phr respectively.

Example 6

A dry mill mix (M5) was prepared by the conventional mill mixing process, in which the amount of Carbon black, silica and nanoclay are 30 phr, 30 phr and 0 phr respectively.

Formulations of mixes are given in Table 1. The cure characteristics and vulcanisate properties of the master batch prepared by the process of present invention and conventional method are compared in Table 2 and Table 3. The ageing characteristics are given in Table 4.

TABLE 1

Formulation of the mixes

| Ingredient | Master batch | Dry mix |
|---|---|---|
| Natural rubber | 100 * | 100 |
| ZnO | 5 | 5 |
| Stearic acid | 2 | 2 |
| Antioxidant HS (2-Mercaptobenzimidazole) | 1.0 | 1.0 |
| Carbon black/silica/nanoclay | 25/25/3 25/25/5 25/25/10 30/30/0 | 30/30/0 |
| Diethylene glycol (DEG) | 1.0 | 1.0 |
| 2,2' Dibenzothiazyl Disilphide (MBTS) | 1.0 | 1.0 |
| Diphenyl Guanidine(DPG) | 0.2 | 0.2 |
| Sulphur | 2.5 | 2.5 |

* For master batch the weight of rubber is excluding the weight of filler.

A comparison of cure characteristics and vulcanisate properties of the master batches prepared by the proposed method are compared with that prepared by the conventional mill mixing and the results are given in Table 2 and Table 3. A lower cure time and scorch time were observed for the master batch prepared by the proposed method using carbon black/silica, each at 30 phr level (M4) as observed from Table 2. It is claimed that the—proposed method thus offers to completely replace the process oil used in conventional rubber compound preparation. It may be noted that process oil currently used are of environmental concern and a significant efforts are taken to find an alternative for the process oils. The addition of nanofiller along with silica and carbon black also showed comparable viscosity of the compound with that of conventional mill mixed compound at equal filler loading.

The vulcanisate properties of the carbon black/silica/nano clay containing tri filler master batches (M1, M2 and M3) prepared using the proposed method is compared with that of the carbon black/silica master batch (M4) prepared by the proposed method as well the carbon black/silica dry mill mix (M5) prepared by the conventional mill mixing process. The formulations of mixes are given in Table 1. No processing oil (aromatic/naphthenic) was used for the mixes. Generally processing oil is used as process aid for mixing fillers). It may be noted that the addition of nanoclay significantly improves the critical properties like modulus, tear strength; abrasion resistance and heat build up. Thus at comparable filler loading, addition of nanoclay showed 26-34% lower abrasion loss and 27-41% lower heat build up when compared to the conventional mill mixed compound containing carbon black/silica compound (M5). The ageing studies of the nanaoclay containing compounds also showed comparable behaviour with control compound (Table 4). Thus these compound can be used in the manufacture of tyre tread formulations where the lower heat build up to ensure low rolling resistance and the consequent lower consumption of fuel while the lower abrasion loss ensure wear resistance; a combination of properties highly sort after by the tyre industry. It is also claimed that the said master batch could find application in the manufacture of tyres as well as demanding non-tyre products such as conveyer belts, engine mountings, bridge bearings etc. It is also claimed that the master batch so prepared do not require processing aids such as aromatic oil or naphthenic oil) to disperse the filler.

TABLE 2

Comparison of cure characteristics at 150° C.

| | Latex Master Batch | | | | Dry Mill Mix |
|---|---|---|---|---|---|
| Carbon black/silica/nanoclay | 25 + 25 + 3 (M1) | 25 + 25 + 5 (M2) | 25 + 25 + 10 (M3) | 30 + 30 + 0 (M4) | 30 + 30 + 0 (M5) |
| Torque Max, dNm | 18.04 | 25.33 | 25.54 | 21.4 | 24.14 |
| Torque Min, dNm | 1.41 | 1.84 | 2.08 | 2.2 | 2.18 |
| Optimum cure time $t_{90}$, minutes | 9.32 | 9.51 | 9.19 | 5.40 | 6.27 |
| Scorch time, $ts_2$, minutes | 2.13 | 2.04 | 2.02 | 1.09 | 1.19 |

TABLE 3

Comparison of vulcanisate properties of the master batches

| Parameters | Latex master batch | | | | Dry mill mix |
|---|---|---|---|---|---|
| Silica/carbon black/nanoclay | 25/25/3 (M1) | 25/25/5 (M2) | 25/25/10 (M3) | 30/30/0 (M4) | 30/30/0 (M5) |
| Modulus 300%, MPa | 8.69 | 14.4 | 12.1 | 14.8 | 12.7 |
| Tensile strength, MPa | 25.74 | 25.5 | 25.4 | 26.6 | 24.7 |
| Elongation at break, % | 553 | 471 | 527 | 460 | 484 |
| Tear Strength, kN/m | 90.4 | 104 | 94.8 | 107 | 95 |
| Hardness, Shore A | 62 | 74 | 70 | 68 | 64 |
| Heat build-up, $\Delta T$, ° C. | 13 | 16 | 16 | 17 | 22 |
| Abrasion loss, mm$^3$/h | 97.3 | 87.5 | 91.8 | 113 | 132 |

TABLE 4

Comparison of mechanical properties of the vulcanizates after ageing (100° C. for 3 days)

| Parameters | Master Batch | | | | Mill Mix |
|---|---|---|---|---|---|
| Silica/carbon black/nanoclay | 25/25/3 (M1) | 25/25/5 (M2) | 25/25/10 (M3) | 30/30/0 (M4) | 30/30/0 (M5) |
| Modulus 300%, MPa | 10.46 | 16.0 | 14.07 | 15.8 | 14.5 |
| Tensile strength, MPa | 25.4 | 22.52 | 22.9 | 23.5 | 23.0 |
| Elongation at break, % | 551 | 415 | 472 | 445 | 412 |

Mixed filler containing master batches prepared by the proposed process showed good cure characteristics as compared to the dry rubber mix. The mechanical properties like tensile strength, modulus, tear strength, abrasion resistance and hardness were superior for the vulcanizates prepared by the proposed method and some of these properties are significantly improved by the addition of 3-5 phr nanoclay (Table 3). The heat build-up values were considerably lower for the latex filler master batches. The significance of adding nanoclay is observed in reducing the abrasion resistance. Comparatively better ageing resistance was also observed for these vulcanizates.

The present invention relates to a novel method of preparing NR based master batch containing carbon black, silica and nanoclay tri-filler system from fresh NR latex The fresh latex is soap sensitized with appropriate amount of surfactant and dispersion of fillers prepared separately are added to the latex under stirring. The latex is then coagulated using acid and processed as currently practiced in TSR production. The latex master batches have low viscosity and therefore there was no need to add petroleum based oils as process aids. The vulcanisate properties of the nanoclay containing master batches prepared by latex stage mixing showed excellent improvement in abrasion resistance and lowering of heat build-up compared to a conventional mill mixing. These compounds can be used to manufacture tyre treads with better fuel efficiency and improved wear resistance.

Without further elaboration, it is believed that one skilled in the art can, using the preceding description, utilize the present invention to its fullest extent. The preferred specific embodiments are, therefore, to be construed as merely illustrative, and not limitative of the remainder of the disclosure in any way whatsoever.

We claim:

1. A process for preparing natural rubber master batch comprises of following steps:
   a. preparing carbon black dispersion by mixing carbon black with at least one surfactant,
   b. preparing silica dispersion by mixing silica with at least one surfactant,
   c. preparing nanoclay dispersion by mixing nanoclay with at least one surfactant,
   d. preparing soap sensitized natural rubber latex by mixing fresh natural rubber latex with at least one surfactant,
   e. adding dispersions of step (a), (b), and (c) slowly into the said soap sensitized natural rubber latex of step (d) under constant stirring to form a master mixture,
   f. adding dilute sulphuric acid to coagulate the said master mixture to form a coagulum of master batch,
   g. dewatering and drying the said coagulum of master batch, characterized in preparing three different dispersions comprising of carbon black dispersion in step (a), silica dispersion in step (b) and nanoclay dispersion in step (c) and adding the said three dispersions slowly into the said soap sensitized natural rubber latex of step (d) under constant stirring to form a master mixture.

2. The process of claim 1 wherein the said surfactant is selected from the group consisting of sodium napthalene formaldehyde sulphonate, ammonium laurate or combination thereof.

* * * * *